United States Patent

[11] 3,600,876

| [72] | Inventor | Hans Tanzer<br>Marchtrenk, Austria |
|---|---|---|
| [21] | Appl. No. | 837,131 |
| [22] | Filed | June 27, 1969 |
| [45] | Patented | Aug. 24, 1971 |
| [73] | Assignee | Epple-Buxbaum-Werke Aktiengesellschaft |
| [32] | Priority | June 27, 1968 |
| [33] | | Austria |
| [31] | | A 6194/68 |

[54] CORN-PICKING MACHINE
7 Claims, 3 Drawing Figs.

[52] U.S. Cl. ..................................... 56/11.2,
56/104, 56/14.1
[51] Int. Cl. ..................................... A01d 45/02
[50] Field of Search ........................... 56/18, 104

[56] References Cited
UNITED STATES PATENTS
2,721,431  10/1955  Andrews ..................... 56/18
2,927,414  3/1960  Jones ........................... 56/104

FOREIGN PATENTS
1,509,507  12/1968  France ........................ 56/104
79,963  1/1963  France ........................ 56/18

*Primary Examiner*—Louis G. Mancene
*Assistant Examiner*—J. N. Eskovitz
*Attorney*—Ernest G. Montague ABSTRACT: A corn-picking machine having picking rollers and shedding ledges located above the picking rollers. The picking rollers and shedding ledges are pivotally mounted at their rear ends when viewed in the moving direction. The shedding ledges are pivotal relative to the rollers. The front ends of the picking rollers and the shedding ledges are connected with each other, which connection is preferably disengageable The support of the front bearing of each picking roller is provided with a pivoting device for pivoting the support together with the corresponding shedding ledge, and the pivoting devices of all picking rollers may be operated by one common driving device.

INVENTOR
HANS TANZER
BY
ATTORNEY.

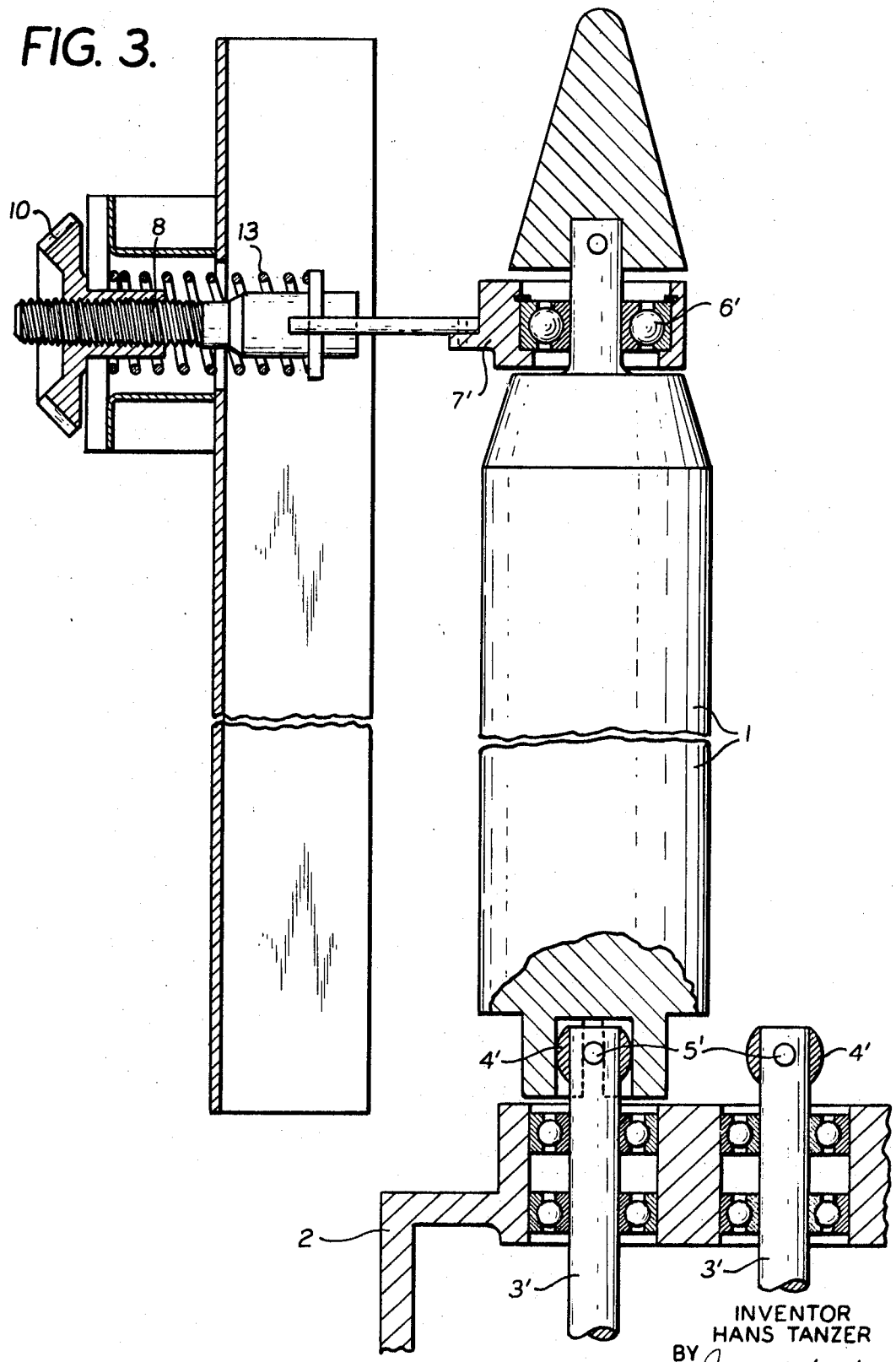

CORN-PICKING MACHINE

The present invention relates to a corn-picking machine which is provided with picking rollers and shedding ledges located above those, the picking rollers and shedding ledges being mounted pivotally at their rear ends when viewed in the direction of motion, and the shedding ledges being pivotal relative to the rollers.

With conventional machines the picking rollers and the shedding ledges have to be moved individually by means of adjusting devices into that position which suits the plants in question in order to ensure that the corncobs are shed and the the stems may be passed through without hindrance. It is rather complicated and time consuming to adjust the various picking rollers and shedding ledges, all the more so as it is quite difficult to operate these devices and as the picking rollers and the shedding ledges have to be adjusted not only before but also during the harvest on account of the difference in plants even in case of one field. Furthermore, these devices, which consist of joints and bellcrank levers, are rather complicated in their construction and, as a consequence, also expensive.

It is an object of the present invention to provide a corn picking machine which avoids these disadvantages and is characterized mainly in that the front side of the picking rollers and the shedding ledges are connected with each other, whereby this connection may preferably be disengaged, and a pivoting device is located on the support of the front bearing of each picking roller in order to move the picking roller together with the corresponding shedding ledge, and the pivoting devices of all picking rollers may be driven by one common driving device.

The corn-picking machine of the present invention provides in an advantageous manner the pivoting of each picking roller together with the corresponding shedding ledge as well as all picking rollers. Each ledge may be shifted relative to the picking roller in a simple manner independently of the picking roller.

It is another object of the present invention to provide a corn picking machine wherein the pivoting devices may be provided with threaded spindles located on supports known per se which may be moved in guides, the threaded spindles being provided with revolving bevel wheels or chain wheels having axial screw borings, and the bevel wheels or chain wheels being propped against a stationary stop by means of a spring located between the stop and the support. The bevel wheels or chain wheels respectively of the pivoting devices are driven contrary to the turning direction and with the same number of rotations to change the angle between the adjacent picking rollers and shedding ledges. According to the present invention the common driving device of the wheels may be driven by a camshaft which is turned by means of a handcrank, the camshaft being connected with the wheels of the pivoting device by means of pinion gears or chain gears. In a preferred embodiment of the corn-picking machine according to the present invention the pivoting devices may be operated from the driver cabin of the machine. For this embodiment the present invention provides two friction discs located at a distance from each other on the camshaft, which conveys the common drive force from the pinion gears or chain gears, the friction discs being moved on the camshaft by a switch gear in the driver cabin; furthermore, the present invention provides for a stationary and rotating friction cylinder located between the two friction discs in a radial and parallel arrangement, which is driven by the feeding cylinder of the machine.

According to the present invention the supports of the picking rollers are provided with threaded bolts in order to adjust the shedding ledges to the size of the plant stems, whereby the bolts penetrate into longitudinal slots in the shedding ledges and are provided with nuts to hold the ledges. Only once, i.e. at the beginning of the harvest, the shedding ledges are adjusted to the size of the plants.

With the above and other objects and other objects in view, which will become apparent in the following detailed description, the present invention will be clearly understood in connection with the accompanying drawing, in which:

FIG. 3 is an elevation of a picking roller partly in section.

Figure 1:
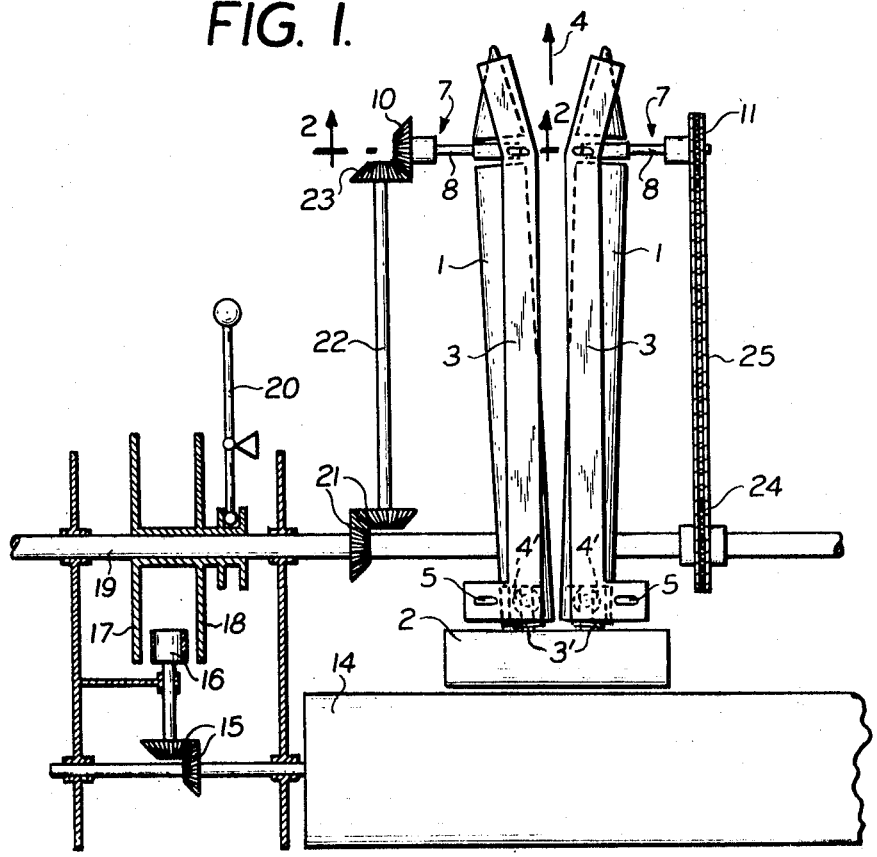
FIG. 1 is a schematic top view of the picking rollers, the shedding ledges as well as the driving device for their pivotal movement.
Figure 2:
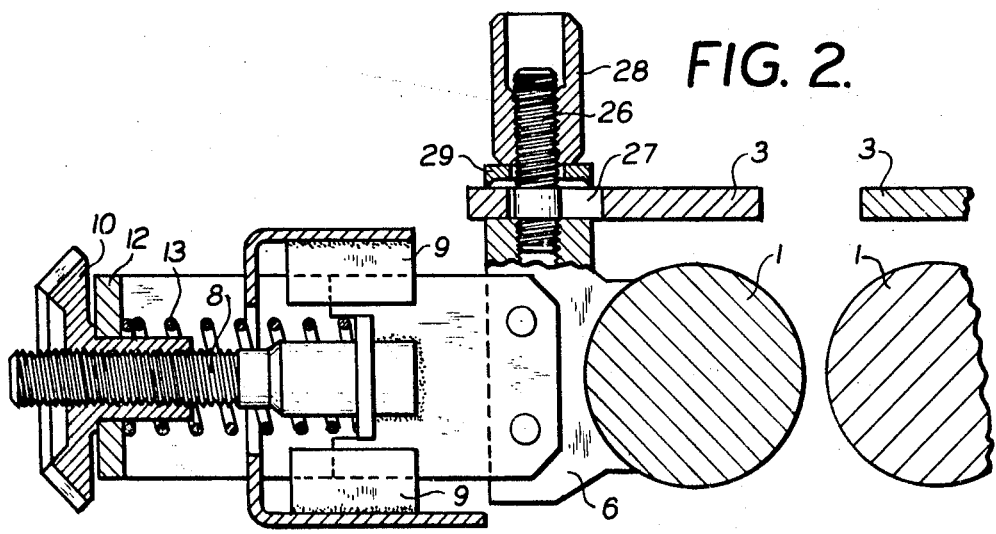
FIG. 2 is an enlarged partly broken-away sectional view of the picking rollers and the shedding ledges taken along the lines 2—2 of FIG. 1.

Referring now to the drawings and more particularly to FIG. 1, shedding ledge 3 is provided above every picking roller 1, which is driven by angular transmission 2 of the machine (shown only partly in FIG. 1). The shedding ledge 3 is coupled to connecting pin 5 next to the rear end of the roller when viewed in the moving direction (arrow 4) being pivotally connected next to the rear end of the roller with the machine frame (not illustrated) by the connecting pin 5, and is connected with its front end to the support 6 of the front bearing of the roller in an adjustable manner. The support 6 of every picking roller is provided with a pivoting device 7 for adjusting the distance between two cooperating picking rollers and shedding ledges jointly. Each of these pivoting devices is provided with a threaded spindle 8 linked to support 6 which is movable in guides 9. The guides 9 are fastened to the frame of the machine, thus fixed in position. A revolving bevel wheel 10 or chain wheel 11 having axial screw borings is attached to the spindle, the wheel being borne in a stationary stop 12 and propped against the stop by means of a spring 13 provided between the stop and the arm (FIGS. 1 and 2). When turning the bevel or chain wheels, supports 6 are moved in the guides towards or away from each other depending on the rotating direction, and thus the cooperating picking rollers with their shedding ledges are pivoted towards or away from each other.

According to FIG. 1 the driving force for the wheels is derived from feeding cylinder 14 whose camshaft drives friction cylinder 16 via bevel wheel drive 15. The friction cylinder is provided between two friction discs 17, 18 in a radial and parallel arrangement with them, the friction discs being mounted on a camshaft 19 at a fixed distance from each other.

The friction discs may be moved on the camshaft through switch gear 20 which is located in the driver cabin, so that the inner surface of one of the two discs—depending on the direction of the movement—touches the friction cylinder, transferring thus both directions of rotation to camshaft 19. As can be seen at the one side of the picking rollers in FIG. 1, the camshaft drives bevel wheel 23 engaging bevel wheel 10 via camshaft 22.

In FIG. 1 the drive of the chain wheel 11 is shown on the other side of the picking rollers, in which bevel wheel drives 21 and 10, 23 and camshaft 22 are replaced by a chain wheel drive consisting of chain wheels 11, 24 and chain 25.

However, the pivoting devices may also be commonly driven by turning camshaft 19 with a handcrank (not shown in the drawings), which simplifies the construction of the machine since friction gears 17, 18, 19 are not required.

According to FIG. 2, a threaded bolt 26 is provided on each support 6 of the picking rollers in order to adjust the shedding ledge, the bolt penetrating into a longitudinal slot 27 of the shedding ledge 3. Nuts 28 and cutting discs 29 help to form a tight connection between the shedding ledges and the supports after the necessary distance between the ledges has been established.

Referring now to FIG. 3, the picking roller 1 and a part 2 of the angular transmission 2 are disclosed. The shafts 3' with the ball-shaped ring 4' and a connecting pin 5' project from the drive housing. The connecting pin 5' transmits the drive to the shafts 3'. The cross movement of the picking roller 1 is assumed above the ball-shaped ring 4'. The picking roller 1 is supported by a front roller bearing 6', which is secured in a corresponding bearing carrier 7'. The latter is operatively connected by an adjustment spindle 8, whereby a drive bevel gear 10 brings about the adjustment. The bevel gear 10 can be replaced by a chain wheel. A pressure spring 13 serves the purpose of resiliently supporting the picking roller 1.

For the purpose of better demonstration a single roller 1 is disclosed in FIG. 3, but a second picking roller is operatively connected with the shaft end in the same manner.

While I have disclosed one embodiment of the present invention, it is to be understood that this embodiment is shown by example only and not in a limiting sense.

I claim:

1. A corn-picking machine, comprising
picking rollers,
a shedding ledge located above each of said picking rollers,
said picking rollers and shedding ledges being mounted pivotally at their rear ends when viewed in the moving direction, and said shedding ledges being pivotal relative to said picking rollers,
means for disengageably connecting the front ends of said picking rollers and a corresponding of said shedding ledges with each other,
a front bearing means for each picking roller,
support means for said front bearing of each picking roller including a pivoting means for pivoting said support means together with the corresponding shedding ledge, and
a common driving means for operating said pivoting means of all of said picking rollers.

2. A corn-picking machine comprising
picking rollers,
a shedding ledge located above each of said picking rollers,
said picking rollers and shedding ledges being mounted pivotally at their rear ends when viewed in the moving direction, and said shedding ledges being pivotal relative to said picking rollers,
means for disengageably connecting the front ends of said picking rollers and a corresponding of said shedding ledges with each other,
a front bearing means for each picking roller,
support means for said front bearing of each picking roller including a pivoting means for pivoting said support means together with the corresponding shedding ledge, and
a common driving means for operating said pivoting means of all of said picking rollers, said pivoting means comprises a threaded spindle engaging said support means,
guides in which said support means is movable, a revolving bevel wheel or a chain wheel having axial screw borings operatively attached to said threaded spindle,
a stationary stop,
a spring disposed between said stationary stop and said support means, and
said bevel wheel or chain wheel is propped against said stationary stop by means of said spring.

3. The corn-picking machine as set forth in claim 2, further comprising
a camshaft,
tooth gears or chain gears operatively connecting said bevel wheel or chain wheel, respectively, to said camshaft, and means for turning said camshaft.

4. The corn-picking machine, as set forth in claim 2, further comprising
a camshaft,
two friction discs located on said camshaft at a distance from each other,
means for moving said friction discs,
a stationary, rotating friction cylinder means located between said two friction discs in a radial and parallel arrangement therewith for providing a common drive for said bevel wheel or chain wheel, and
a feeding cylinder means of said corn-picking machine for driving said friction cylinder.

5. The corn-picking machine as set forth in claim 1, further comprising
threaded bolts provided on said support means of said picking rollers,
said shedding ledges are formed with longitudinal slots into which said threaded bolts penetrate, and
nuts disposed on said threaded bolts for securing said shedding ledges on said support means.

6. The corn-picking machine, as set forth in claim 3, wherein
said turning means is a handcrank.

7. The corn-picking machine, as set forth in claim 4, wherein
said moving means comprises a switch gear provided in a driver cabin.